(12) United States Patent
Cheng et al.

(10) Patent No.: US 7,158,850 B2
(45) Date of Patent: Jan. 2, 2007

(54) WIRELESS WAFER CARRIER IDENTIFICATION AND ENTERPRISE DATA SYNCHRONIZATION

(75) Inventors: Chien-Fei Cheng, Shindian (TW); Bruce Chen, Jiali Jen (TW); Yuan-Ching Lu, Jungli (TW); Li-Ren Lin, Hsin-Chu (TW); Shi-Ming Wang, Tainan (TW); Pei-Chen Yeh, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 943 days.

(21) Appl. No.: 10/172,089

(22) Filed: Jun. 14, 2002

(65) Prior Publication Data

US 2003/0233161 A1    Dec. 18, 2003

(51) Int. Cl.
  *G06F 19/00*    (2006.01)
(52) U.S. Cl. .................. 700/121; 700/115; 700/168; 235/375
(58) Field of Classification Search ............... 700/121, 700/108–115, 116, 168; 705/28–29; 340/10.1, 340/572.1, 10.52, 10.42; 235/375, 380, 383, 235/376, 385
See application file for complete search history.

(56) References Cited

U.S. PATENT DOCUMENTS 6,330,971 B1 * 12/2001 Mabry et al. ............... 235/383
6,351,684 B1 * 2/2002 Shirley et al. .............. 700/121
6,509,828 B1 * 1/2003 Bolavage et al. .......... 340/10.1
6,616,034 B1 * 9/2003 Wu et al. .................... 235/375

FOREIGN PATENT DOCUMENTS

WO    WO 01/82009 A2 *   11/2001

* cited by examiner

*Primary Examiner*—Kidest Bahta
(74) *Attorney, Agent, or Firm*—Tung & Associates

(57) ABSTRACT

A semiconductor fabrication enterprise includes fabrication equipment, transportable containers for work—in—process and an enterprise information system. The transportable containers have associated radio frequency tags having identification codes uniquely identifying the carriers in the fabrication process. The enterprise information system contains data corresponding to each such identification code. The identification codes are read by a radio frequency interrogation device, and the radio frequency interrogation device carries out transactions with the enterprise data system to transfer the data corresponding to the identification codes to the radio frequency interrogation device. The radio frequency tags may be adapted for read/write functionality allowing for writing data to the radio frequency tags and synchronization of radio frequency tag data and enterprise information system data.

25 Claims, 2 Drawing Sheets

US 7,158,850 B2

WIRELESS WAFER CARRIER IDENTIFICATION AND ENTERPRISE DATA SYNCHRONIZATION

TECHNICAL FIELD

The present invention is generally related to microchip fabrication. More particularly, the invention relates to wireless wafer carrier identification and work—in—process (WIP) information retrieval and synchronization.

BACKGROUND OF THE INVENTION

Growth in the semiconductor fabrication industry over the last thirty years has averaged about fifteen percent. This growth has also dictated high capital costs with short obsolescence times which places intense pressures upon the fabricators to increase productivity. Certain technology enhancements, for example copper metal layers and interconnects, while providing superior device performance and simplified structures, come with logistical penalties due to complexities in device manufacture thus making productivity gains even more difficult.

Automation of material handling is becoming more critical in the industry as it strives for increased productivity. Most manufacturers employ some level of automated intrabay handling and some employ automated interbay transfer of wafers to process tools. Industry consortia have developed various standards for next generation 300 mm wafer fabrication operations, for example, standardized carriers and loadports. Automated material handling systems including hoists and overhead transports are capable of delivering front-opening unified pods (FOUP) directly to load ports.

Material execution systems (MES) and material control systems (MCS) are widely used by integrated circuit fabricators to track process and logistical attributes of the manufacturing operations. MES systems generally determine where material should go and when it should go there, while MCS generally determines how material should get to its determined destination and then manages its transportation. In some systems, there is no MES; rather, operators request material transfers from an MCS interface. MES and MCS also interface with other enterprise systems on one hand and industrial process systems on the other hand. Significant gains in utilization of operational assets have been realized by the adoption of MES and MCS. More specifically, MES and MCS enable critical data collection, process management, maintenance management, and WIP tracking and genealogy. Production and parametric data associated with WIP is used to populate database records for real time in-process or historical usage. The data may be collected on the factory floor or automatically from process equipment. Process management aspects of MES and MCS enable automatic corrections in sophisticated, highly automated systems or provide decision support to operators for correcting and improving in-process activities. Maintenance management of course tracks and directs activities to maintain equipment, tools and carriers. The product tracking aspects enables snap shot visibility of where WIP resides and status information as well as WIP material supplier, lot information, customer data, serial numbers, current production conditions and alarms or flags signaling rework or other exceptions related to the WIP.

Carriers for transporting, storing and processing wafer cassettes are employed in microchip fabrication and continue to play a more important role in the quest for completely automated and integrated manufacturing. Information corresponding to the wafers in a particular carrier is commonly stored in an electronic data card mounted to the container. The data card is adapted to store process and equipment data corresponding to the wafers within the associated container and the associated container and its WIP. Furthermore, the data card may be adapted to interface electronically with each processing station when the container is engaged with the processing station. Such interfacing provides for the two-way transfer of data between the data card and a local controller associated with the processing station. The local controllers may be networked to communicate with MES and MCS. A display associated with each local controller may display data read from the data card mounted to the carrier that is then currently engaged with the corresponding station. The data card may itself include alphanumeric display means such as a liquid crystal display for the display of the information stored therein. Typically, data is stored and displayed in a certain number of rows of a certain number of characters, for example fourteen rows of sixteen characters each. An operator may request display of the information by pressing buttons located on the face of the data card. Limited display space on the display means requires toggling through lines of stored data to find the data of interest to the operator. This is the typical manner in which any data stored on the data cards is retrieved. Limited battery capacity of the data card necessitates operator requests to display the data and further necessitates automatic display disablement between such requests to prevent battery depletion during extended periods of storage. Batteries that have to be replaced while a carrier is in process causes disruption to the production schedule and material flow. Furthermore, as automated material handling systems become more commonplace, the operator will have less opportunity to access such data cards and shorter intervals when access is available. Additionally, such data cards are not always compatible with all processes carried out. For example, carrier immersions for clean and rinse operations require the laborious removal of data cards from the carrier. Data cards are expensive and costs are multiplied by the number of carriers in a fabricator's process.

High equipment utilizations, logistical complexities related thereto and to new process requirements, larger and heavier carriers (particularly with next generation 300 mm fabrication), and trends toward complete automated handling systems all result in less operator handling of work in process (WIP) without interfering with and interrupting material flow. Any interruption of WIP by an operator is more undesirable as less opportunity for such interruptions without cascading process effects are available in a tightly controlled and scheduled fabrication process. However, it remains necessary that the operator be able to identify WIP and to be timely apprised of the various process and equipment information related thereto. It is also desirable that the operator remains aware of various process and logistical attributes of the manufacturing operation.

SUMMARY OF THE INVENTION

Therefore, it is one object of the present invention to enable a more efficient, productive semiconductor fabrication enterprise.

It is a further object of the present invention to provide for operator access to critical WIP information in a manner that is not disruptive to the manufacturing process.

It is a further object of the present invention to establish improved integration of operators with WIP and enterprise information systems.

It is a further object of the invention to provide for a convenient means for synchronizing enterprise data sources and distributed WIP data sources.

These objects and advantages of the present invention are realized in a semiconductor fabrication enterprise including an enterprise information system, semiconductor fabrication equipment, transportable WIP carriers having RF tags containing WIP identifying data, and a wireless interrogation device adapted to read WIP identifying data, access the enterprise information system and read WIP data from the enterprise information system.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
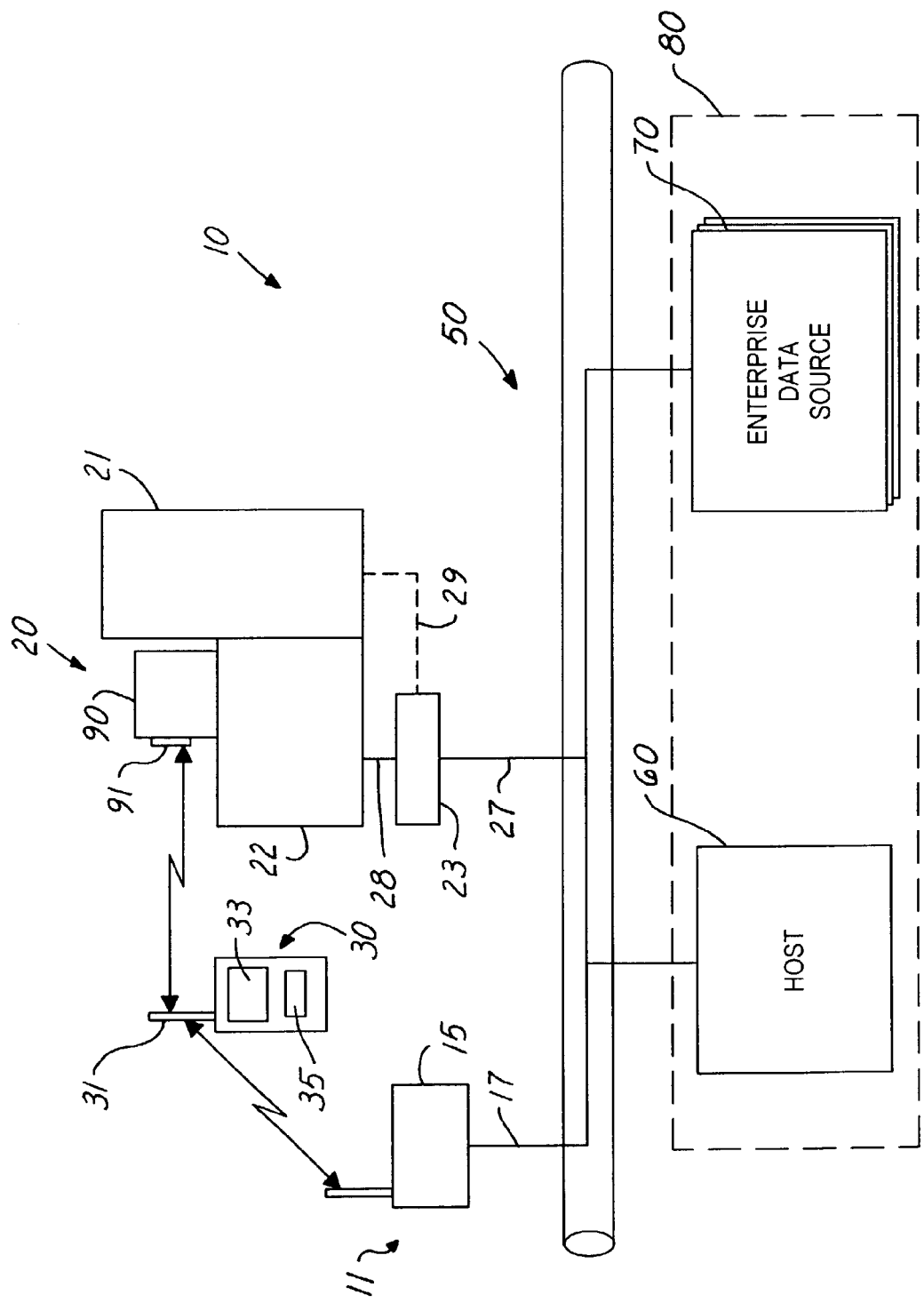
FIG. 1 is a schematic drawing including industrial, networking and enterprise management hardware which illustrates one embodiment of the present invention; and, FIG. 2 is a software system schematic illustrating various software processes in accordance with one embodiment of the present invention.

With reference first to FIG. 1, a semiconductor fabrication enterprise 10 is illustrated. The enterprise 10 includes, but is not limited to, semiconductor fabrication equipment 20, material handling equipment (not shown other than in conjunction with exemplary workstation equipment later described), data network 50, and enterprise information systems 80.

Semiconductor manufacturing equipment 20 includes as non-limiting examples, workstations 21. The workstations 21 in the enterprise will vary in number and function in accordance with many factors including the production volumes and variety of products fabricated by the enterprise. As non-limiting examples, workstations may be configured to perform various metrology functions; dry or wet etchings; resist, metal, or glass depositions; and patterning including exposing and developing. Semiconductor material handling system may include overhead conveyors, automatic guided vehicles, operators, or other inter-workstation conveyance means (not shown) and transfer apparatus 22 adapted for automated transfer of a wafer cassette (not shown) containing a plurality of wafers between the workstation 21 and transportable carrier 90.

Carrier 90 has a relatively small, included volume that provides a substantially contaminant free environment for wafers that is not subject to infusion of contaminants by way of uncontrolled gas exchanges. Carrier 90 is adapted for mechanically interfacing with workstation 21 such that a contaminant free transfer of a cassette of wafers into and out of the workstation 21 is accomplished. The cassette is mechanically transferred from the container to the workstation 21 by transfer apparatus 22. After processing at the workstation 21, the cassette is returned to the carrier in a reverse fashion.

Carrier 90 is additionally configured with a radio frequency identification tag (RF tag) 91. RF tag 91 may be removably adhered to carrier 90 such as with adhesive packaging or be permanently or semi-permanently embedded within the carrier 90. Semi-permanent installations provide the preferred balance between robust apparatus and serviceability. RF tag 91 provides for wireless data sharing such as with a RF client. The operable frequency range of the RF tag 91 is selected in accordance with the RF client device applied. RF tag operational frequencies range from about 125 MHZ to about 2.45 GHz.

RF tag 91 includes such conventional items as an antenna, integrated circuit, nonvolatile memory, software and circuitry to at least permanently store identification data and other data, interpret and process commands received from the interrogation source, and respond to requests for data. RF tag non-volatile memory may have read/write capabilities thereby enabling its data storage to be periodically updated as required and provide dynamic memory functionality.

RF tag 91 may be active or passive. Active RF tags employ a pendant power source such as a battery and are characterized by relatively strong transmission capabilities. Passive RF tags have no pendant power source but obtain energy for transmission and other functions from the RF energy of an interrogation source. Generally, RF tags transmit data by modulating the impedance that the antenna presents to the interrogation source thereby modulating the reflected signal which is read by the interrogation source.

At a minimum the data residing with the RF tags includes a unique identification code in the non-volatile memory such that each carrier in process shall be distinguishable from the others thereby enabling product tracking. Full records in at least an enterprise information system can be created around such an identification code relating carrier maintenance schedule and carrier type data to the carrier identification code, and relational databases may be built linking the wafers in a carrier with material supplier, lot information, customer data, serial numbers, production conditions and alarms or flags signaling rework or other exceptions uniquely related to the WIP. It is also envisaged that such full records including carrier maintenance schedule and other carrier type data may be include in the non-volatile memory of the RF tag. Of course, read/write capability in the RF tags enable them to provide a vehicle for actively collecting process related data either uniquely related to the WIP within the carrier or generally related to the fabrication process.

A local equipment controller 23 has a communication link with transfer apparatus 22 to control the loading and unloading of the wafer cassette between carrier 90 and workstation 21 in accordance with operator requests or predetermined criteria and automatic operations. For example, local equipment controller 23 is provided with data corresponding to the carrier 90 to ensure that the correct material has been delivered to the transfer apparatus 22. In some applications, data corresponding to workstation control may be communicated from local equipment controller 23 to workstation 21 by communication link 29. Such workstation control data may be determined by routines executed in the local equipment controller 23 upon data corresponding to prior wafer processes or measurements, such as metrology data. Alternatively, such workstation control data may be determined by routines executed in remote process controllers (not shown). In any case, local equipment controller 23 has communication link 27 to network 50 which allows for network data transfers including the transfer of WIP data to the enterprise data source. A preferred communication link suitable for local equipment controller 23 complies with the Semiconductor Equipment and Materials International (SEMI) High Speed Message Services (HSMS) standard which uses with Transmission Control Protocol/Internet Protocol (TCP/IP).

Network 50 is a Local Area Network (LAN) but may alternatively be implemented as a Wide Area Network (WAN) or intranet. Network 50 may support a variety of connections in addition to those illustrated in FIG. 1 from semiconductor fabrication equipment 20 and enterprise information systems 80. For example, a plurality of client connections including networked personal computers (not shown) and wireless radio frequency (RF) Personal Digital Assistants (PDA) 30.

The present invention contemplates that RF PDA is a preferred client and interrogation device; however, it is recognized that other RF devices such as cellular telephony devices with interact access capabilities, wireless laptop and handheld computers, or other RF terminals and personal productivity devices, are equally within the scope of the implementation scope invention with the recognition that the wireless network connections and RF tag will need to be adapted as will be recognized by one skilled in the art. In the present exemplary embodiment, PDA 30 includes user interface screen 33 and input means 35. A wireless communication card (not separately shown) is part of the hardware also. Input means may be any of a variety of well-known buttons or keys, such as an alpha numeric keypad (including conventional telephony combined alpha numerics <1> <2ABC> <3DEF>, etc.), and scroll and directional arrows. Other known input means including screens 33 responsive to touch or pen-like input devices, track balls, scroll wheels and mouse-like devices, and voice responsive input means are also contemplated.

PDA 30 includes antenna 31 for use as communication link with a wireless access point 11. Access point 11 comprises a wireless transceiver or router 15 and link 17 to network 50. Plant floor set-ups may also require repeater units or relays that extend coverage of the wireless communication. Multiple drops providing distributed access points may be employed or a single base station with a plurality of repeaters as needed may be employed. Router 15 preferably complies with IEEE 802.11*b* High Rate wireless LAN standard. Alternative connections depending on client device may include RF terminals that connect to the network 50 via a networked personal computer in the case of handheld terminals for example.

PDA 30 is adapted, as subsequently described with respect to the software system schematic of FIG. 2, to access the network via access point 11 and RF tag 91 of carrier 90. PDA 30 provides the necessary interrogation source, including RF tag energization and communications for data transfers. Data transfer includes such information as necessary to establish communication with the RF tag and provide commands thereto which the RF tag then acts upon. Commands include requests for data to be sent to the interrogation device from all or some of the non-volatile memory locations, and requests for data to be written to all or some of the non-volatile memory locations in a read/write adaptation. PDA 30 similarly communicates commands and effects data transfers between it and one or more enterprise data sources 70 via a host computer 60, preferably though not required in a client/server software architecture as later described with respect to FIG. 2.

RF tag 91 in each carrier has assigned to it and stored in particular non-volatile memory locations a unique identification code as previously described. The code may be a simple binary number. Assignment of carrier codes may be accomplished in any suitable fashion including on a carrier-by-carrier basis with PDA at a time prior to the carrier utilization in the production system. Preferably, assignment of carrier identification codes is accomplished with coordination with an enterprise data source, such as a material execution system (MES) such that each carrier has assigned thereto an identification code that is unique within the semiconductor fabrication enterprise system 10. With the exemplary semiconductor fabrication enterprise system 10 as described, an operator carrying a PDA may approach a carrier 90 of interest anywhere on the plant floor from beginning to end of processing and interrogate the RF tag associated therewith to read at least the carrier's identification code. With the identification code of the carrier known, the MES or other enterprise data source as the case may be can be related to the carrier contents. Some of such data associated with each carrier will remain constant throughout the entire fabrication process and some of such data will change through the same period. Allowing for updates of the enterprise data sources throughout the fabrication process, the operator is thereby provided with the latest WIP data associated with the carrier interrogated vis—à—vis network queries of the enterprise data sources of interest. Updates of the enterprise data sources may be by way of local equipment controller 23, by way of PDA or other means in communication with the network such as material handling equipment. Where RF tags utilize read/write capable memory, process data that is either uniquely related to the WIP within the carrier or generally related to the fabrication process may be retrieved by the PDA and provided to the enterprise information systems for use in managing the fabrication process or in the synchronization of the enterprise data sources to the RF tag. Of course, provision of data from the enterprise data sources to the RF tag is also envisaged, as is synchronization of a RF tag to the enterprise data sources.

Figure 2:
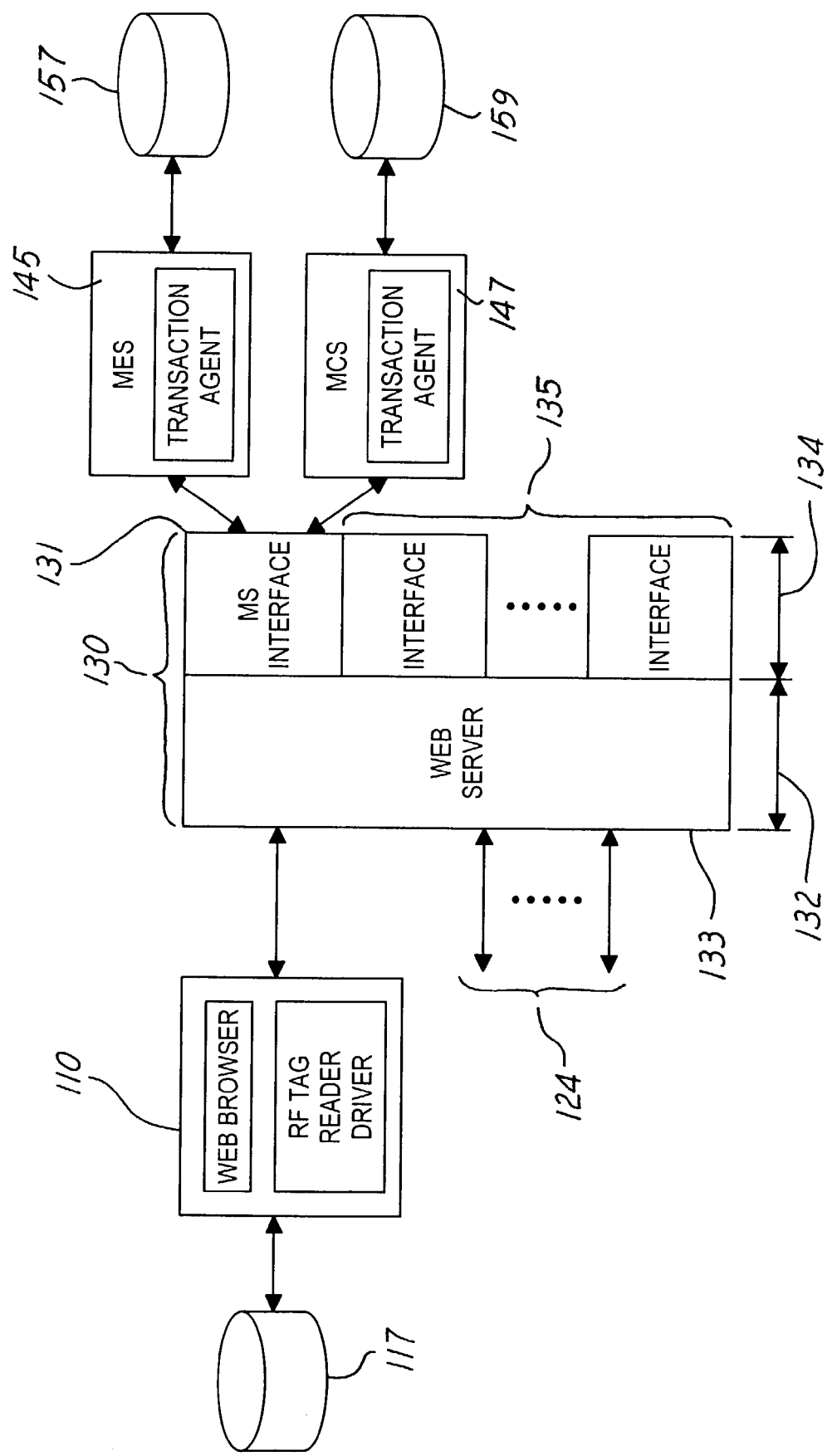

Turning now to FIG. 2, an exemplary software implementation based on a three-tier client/server application is displayed. Client process 110 is, consistent with the hardware embodiment of the enterprise system of FIG. 1, resident with a RF PDA. Included, among other modules, are a web browser which provides a graphical user interface and RF tag reader driver for performing tasks associated with interrogation of the RF tag and enterprise data sources among others. PDA 30 may also include other client processes.

RF tag data storage means 117 includes the functionality afforded by the RF tag. That is to say, read only or read/write capabilities of the non-volatile memory locations. RF tag reader driver manages the data interrogation including energization of RF tag and requests for data and receipt thereof. In read/write capable RF tag the RF tag reader driver additionally manages the data transfers to the RF tag data storage means 117.

Central in FIG. 2 is transaction gateway 130 comprising web server layer 132 and enterprise system interface layer 134 and is functional to broker transactions between PDA clients and enterprise data sources. Transaction gateway 130 is, consistent with the hardware embodiment of FIG. 1, resident with host computer 60. Web server layer 132 comprises web server 133 which provides server processes responsible for accepting and acting on client requests, dispatching queries and responses to clients, issuing transactions to enterprise data sources, and accepting responses from enterprise data sources. Web server 133 interfaces with client 110 and may interface with a plurality of other clients 124 related or unrelated to MES or MCS transactions. System interface layer 134 comprises service processes to interface with enterprise data sources providing such format conversions as are required for message transactions and data transfer between client and enterprise data sources. System interface layer 134 may include a plurality of interfaces 135 unrelated to the exemplary enterprise data sources described herein. System interface layer 134 includes a material systems (MS) interface 131. Host computer 60 of course may also provide application processes in addition to the file system services presently described and illustrated as transaction gateway 130. Alternatively, transaction gateway 130 may be provided on a network server having more limited functionality related to file system services.

MS interface 131 comprises service programming to interface with MES 145 and MCS 147 and provides such format conversions as are required for message transactions and data transfer between client and MES and MCS. MES and MCS each include respective data storage means 157 and 159, generally conventional high capacity electronic disk storage. MES and MCS each include a transaction agent functional to broker transactions between transaction gateway and respective material systems data storage means 157 and 159.

The invention has been described with respect to certain preferred embodiments to be taken by way of example and not by way of limitation. Certain alternative implementations and modifications may be apparent to one exercising ordinary skill in the art. Therefore, the scope of invention as disclosed herein is to be limited only with respect to the appended claims.

The invention in which an exclusive property or privelege is claimed are defined as follows:

1. A semiconductor fabrication enterprise for portably and wirelessly communicating with a wafer carrier and an enterprise information system comprising:
   an enterprise information system;
   a transportable WIP carrier having an RF tag containing WIP identifying data; and,
   a wireless interrogation device adapted to read WIP identifying data from the RF tag and wirelessly communicate with the enterprise information system to receive WIP data from the enterprise information system corresponding to the WIP identifying data, both of said read and receive operations portably performable.

2. A semiconductor fabrication enterprise as claimed in claim 1 wherein said wireless interrogation device comprises a client process and said enterprise information system comprises a server process.

3. A semiconductor fabrication enterprise as claimed in claim 2 wherein said client process and said server process comprise portions of a three-tier client/server system.

4. A semiconductor fabrication enterprise as claimed in claim 1 wherein communication between said wireless interrogation device and said enterprise information system is effected over a three-tier client/server system.

5. A semiconductor fabrication enterprise as claimed in claim 1 wherein said RE tag comprises writable memory and said wireless interrogation device is adapted for writing data to the RE tag.

6. A semiconductor fabrication enterprise as claimed in claim 1 wherein said RE tag further includes writable memory and said wireless interrogation device is adapted for synchronizing data between the RE tag and the enterprise information system.

7. A semiconductor fabrication enterprise as claimed in claim 1 wherein the wireless interrogation device is selected from the group comprising personal digital assistants, cellular telephones, portable computers including laptop and handheld, personal productivity devices and wireless terminals.

8. A semiconductor fabrication enterprise as claimed in claim 1 wherein the wireless interrogation device comprises a graphical user interface.

9. A semiconductor fabrication enterprise as claimed in claim 7 wherein the wireless interrogation device comprises a graphical user interface.

10. A WIP information system for a semiconductor fabrication enterprise for portably and wirelessly communicating with a work-in-progress (WIP) container and an enterprise data source cornprising:
    a WIP container adapted for the transportation of WIP through a semiconductor fabrication process;
    a RF tag having readable memory programmed with a unique identification code, said RF tag being attached to the WIP container;
    an enterprise data source including WIP data corresponding to the identification code; and,
    a RE interrogation device adapted to read the identification code from the RF tag and wirelessly communicate the identification code to the enterprise data source to request and receive the WIP data corresponding to the identification code, said read and request and receive operations portably performable within said semiconductor fabrication enterprise while said RF interrogation device is portably handheld.

11. The WIP information system for a semiconductor fabrication enterprise as claimed in claim 10 wherein said RE tag further includes writable memory and said RE interrogation device is adapted for writing data to the RE tag.

12. The WIP information system for a semiconductor fabrication enterprise as claimed in claim 10 wherein said RF tag further includes writable memory for WIP data and said RF interrogation device is adapted for synchronizing WIP data between the RF tag and the enterprise data source.

13. The WIP information system for a semiconductor fabrication enterprise as claimed in claim 10 wherein the RF interrogation device is selected from the group comprising personal digital assistants, cellular telephones, portable computers including laptop and handheld, personal productivity devices and wireless terminals.

14. The WIP information system for a semiconductor fabrication enterprise as claimed in claim 10 further comprising a network including a wireless access point through which the RF interrogation device issues transactions to the enterprise data source.

15. The WIP information system for a semiconductor fabrication enterprise as claimed in claim 14 wherein the issued transactions are brokered by a transaction gateway in a three-tier client/Server system.

16. The WIP information system for a semiconductor fabrication enterprise as claimed in claim 10 wherein the RF interrogation device comprises a graphical user interface.

17. The WIP information system for a semiconductor fabrication enterprise as claimed in claim 13 wherein the RF interrogation device comprises a graphical user interface.

18. Method for wireless and portable data communication in a semiconductor fabrication enterprise for wirelessly and portably communicating with a work-in-progress (WIP) carrier and an enterprise data source comprising the steps:
    providing a WIP carrier for WIP, the carrier having attached thereto a RE tag;
    assigning to the RE tag a unique identification code;

providing an enterprise data source including data corresponding to the identification code;

approaching said WIP carrier to read the identification code from the RF tag with a RE interrogation device, said RE interrogation device portably handheld;

wirelessly requesting with the RE interrogation device from the enterprise data source the data corresponding to the identification code; and, wirelessly providing to the RE interrogation device the data corresponding to the identification code from the enterprise data source;

wherein said steps of reading, requesting and providing are performable while said RE interrogation device is portably handheld.

19. The method for data communication in a semiconductor fabrication enterprise of claim 18 wherein the step of providing an enterprise data source includes networking the enterprise, data source to data collection means and periodically updating the enterprise data source.

20. The method for data communication in a semiconductor fabrication enterprise of claim 19 wherein the data collection means comprises the RE interrogation device.

21. The method for data communication in a semiconductor fabrication enterprise of claim 19 wherein the data collection means comprises semiconductor fabrication equipment controllers.

22. The method for data communication in a semiconductor fabrication enterprise of claim 18 wherein the RE interrogation device is selected from the group comprising personal digital assistants, cellular telephones, portable computers, including laptop and handheld, personal productivity devices and wireless terminals.

23. The method for data communication in a semiconductor fabrication enterprise of claim 18 further comprising the steps:

writing to the RE tag the data corresponding to the identification code provided to the RE interrogation device from the enterprise data source.

24. The method for data communication in a semiconductor fabrication enterprise of claim 23 wherein the RF interrogation device is selected from the group comprising personal digital assistants, cellular telephones, portable computers including laptop and handheld, personal productivity devices and wireless terminals.

25. The method for data communication in a semiconductor fabrication enterprise of claim 18 further comprising the step of synchronizing said data between the RE tag and the enterprise information system.

* * * * *